United States Patent [19]
Mosler

[11] 3,838,256
[45] Sept. 24, 1974

[54] CONSTRAINT CONTROL FOR PROCESSES WITH EQUIPMENT LIMITATIONS

[75] Inventor: Henry A. Mosler, Morristown, N.J.

[73] Assignee: Esso Research and Engineering Company, Linden, N.J.

[22] Filed: Dec. 3, 1973

[21] Appl. No.: 421,034

[52] U.S. Cl...... 235/150.1, 208/DIG. 1, 235/151.12
[51] Int. Cl....................... G06f 15/46, G05d 21/02
[58] Field of Search............. 208/DIG. 1; 235/150.1, 235/151.12

[56] References Cited
UNITED STATES PATENTS
3,665,493  5/1972  Glowzeiski et al............. 235/151.11
3,761,690  9/1973  Sayles et al..................... 235/150.1

*Primary Examiner*—Eugene G. Botz
*Attorney, Agent, or Firm*—Harold N. Wells

[57] ABSTRACT

In a constraint control system which automatically optimizes the performance of a process unit by continuously scanning important operating variables, measuring the deviation of those variables from their preselected target values, identifying the instant limiting variable, and adjusting a predetermined manipulated variable to bring the limiting variable to its target value, when one of the operating variables exceeds its target value and is an equipment limitation, the error signal is augmented to indicate the true extent of the deviation which must be corrected in order to bring that variable back to its target value.

2 Claims, 3 Drawing Figures

CONSTRAINT CONTROL FOR PROCESSES WITH EQUIPMENT LIMITATIONS

BACKGROUND OF THE INVENTION

In U.S. patent application Ser. No. 241,959, now U.S. Pat. No. 3,781,533, assigned to the same assignee as that of the present application, a method was disclosed for the control of refining and chemical process plants in which optimization of the operation was done by a process of continually identifying which variable was closest to its predetermined limiting (target) value and adjusting a manipulated variable so as to move the limiting variable to its target value. This prior application is incorporated by reference in the present application.

The constraint control system of the previous invention provided a method which is broadly applicable to many processes and involves the following steps: (1) determining a set of operating variables to be continuously monitored; (2) establishing a target value for each of those variables; (3) determining the sensitivity of each of the variables to a change in a predetermined manipulated variable; (4) determining which of the operating variables is limiting; (5) adjusting the manipulated variable to bring the limiting variable to its target value. This system is particularly well adapted to optimizing a process or maximizing an important variable. For example, it may be used to operate a process unit at maximum feasible capacity by automatically raising the feed rate until one of the operating variables reaches its target value. After such limit is reached, the control system would maintain this condition until the constraint is removed and the feed rates can be adjusted to attain an even more favorable value. It is possible that through intervention by the plant operators, action could be taken to remove the constraint and permit further adjustment of the manipulated variable (feed rate).

In the earlier application, a distinction was made between two types of constraints, the so-called "soft-constraint", that is, one which can be exceeded and the "hard constraint" which cannot. As an example, the maximum allowable metal temperature of a furnace tube would be a soft constraint. Such a temperature may be exceeded for relatively short periods but the target value is a constraint nonetheless. When a valve position is used as a constraint, the full open position is a "hard" constraint. It is such hard constraints, which are generally equipment limitations, which are the subject of the present invention. When a variable passes its soft constraint (its target value), the value may still be measured and the error will continue to indicate what adjustment of the manipulated variable should be made to bring the variable back to its target value. However, with a hard constraint or equipment limitation, once the limitation has been reached, additional error may exist without being correctly indicated by the value of the variable. For example, if the position of a valve were used as an operating variable and the valve was in a fully open position while the process conditions required that the valve should be more than fully open, the error will appear to be smaller than it actually is. Since the error appears small, the control action taken will be less than it should be and the process unit will be out of control for a longer period than would be desired. In order to correct this situation operating variables subject to hard constraints should give a true indication of the error even after they have exceeded their limiting value. It is this need to which the present invention has been directed.

SUMMARY OF THE INVENTION

Until the hard constraint has been reached the error signal which is transmitted to the control system represents the difference between the target value and the actual equipment operating value. This is given by the following equation:

(1) $E = C - M_E$ where:
 $E$=deviation between actual measurement and the target value (error).
 $C$=target value (constraint)
 $M_E$=actual operating measurement of equipment variable being controlled.

When the hard constraint position is reached, the error calculation is augmented so that in addition to the error given by Equation 1, an additional error is measured and added to the error of Equation 1. This is given by Equation 2:

(2) $E = C - M_E K(SP - M_P)$ where:
 $E$=error
 $C$=constraint
 $M_E$=equipment variable measurement
 $M_P$=actual measurement of process variable related to the equipment variable being measured.
 $K$=proportional constant relating a 1 percent change in the equipment variable to the corresponding change in process measurement.
 $SP$=set point of controller operating to adjust $M_E$ by the value of $M_P$.

The augmented error calculation shows the actual error when the constrained equipment variable no longer indicates the true error. Measurements which are not subject to the equipment limitation are included in the error calculation.

A principal advantage of using the augmented error signal is that control can be maintained very close to the hard constraint limit without concern about serious upsets should the hard limit be exceeded for a time. Thus, it in effect provides a means for preventing hard constraint limits from prematurely determining the optimum or maximum operating condition.

DESCRIPTION OF THE PREFERRED EMBODIMENT

Figure 1:
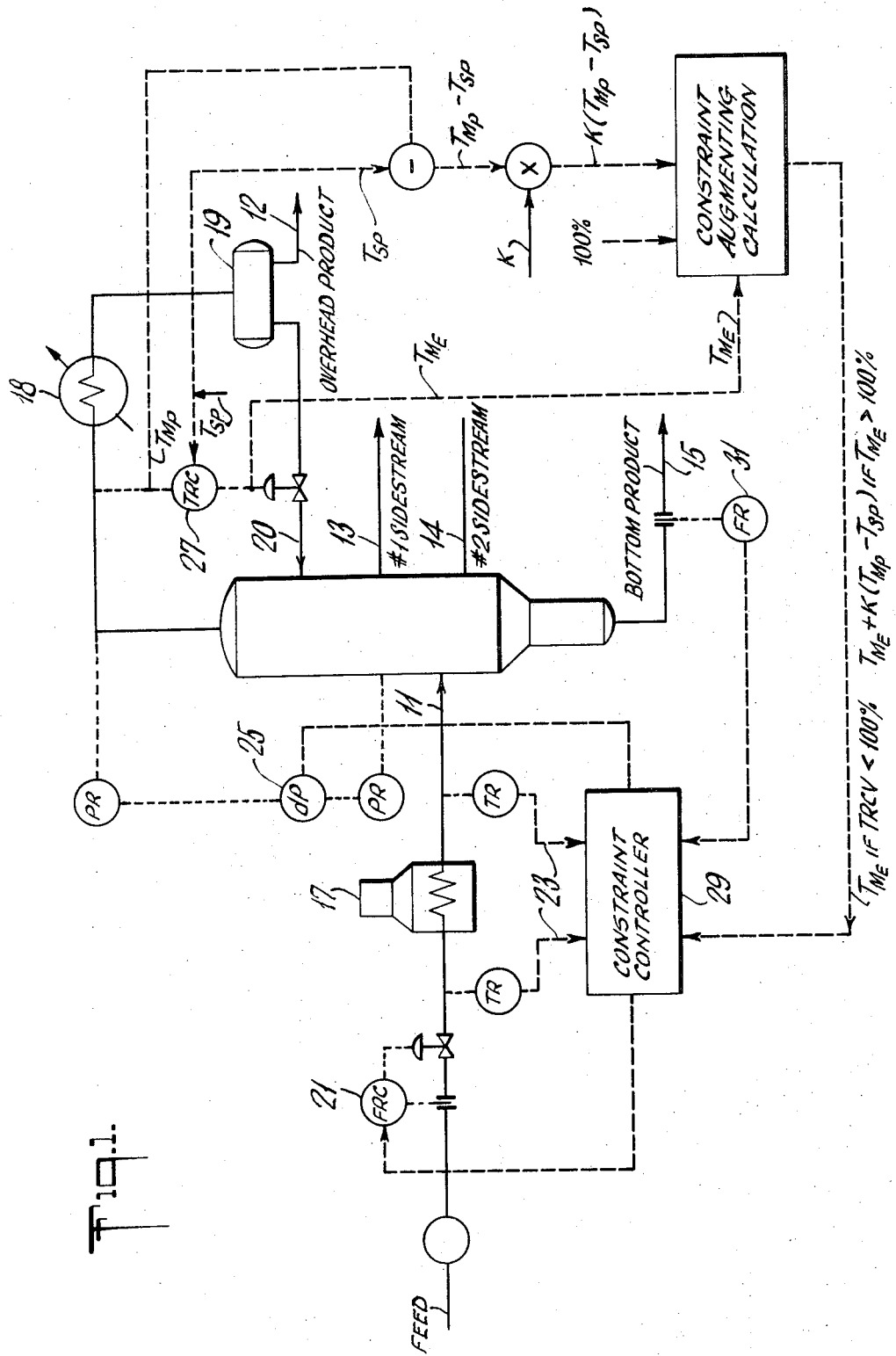
FIG. 1 shows a typical constraint control system application to which the method of the present invention is applied.

FIG. 1 is a flow diagram of a distillation operation. The diagram has been simplified for purposes of illustration. A distillation column 10 is fed by line 11 and produces overhead product by line 12, two side stream products by lines 13 and 14 and a bottom product by line 15. Feed to the column is heated in furnace 17. The vapor passing overhead from the column is condensed in condenser 18, collected in accumulator drum 19 and refluxed through line 20. The feed rate is controlled by flow recorder controller (FRC) 21. It will be considered to be the single most important aspect of the columns performance (the characterizing index) as well as the manipulated variable. The feed flow through FRC 21 should be the maximum possible unless limited because some other variable had reached its target value. Some other objectives such as minimizing furnace firing or maximizing one of the side streams could be used if considered more important than maximizing the feed rate. An important operating variable is the heat input to the column from furnace 17, which is calculated from the feed flow rate measured by FRC 21 and the inlet and outlet temperatures TR 23. The corresponding target values would be established by available burner capacity. Another variable to be monitored is the pressure drop across the column which detects flooding of trays when excessive flow rates occur, differential pressure across the column being measured by Delta-P instrument 25. The target value will be set so that flooding is avoided. The overhead temperature from column 10 is measured by temperature recorder/controller TRC 27, which controls the reflux returning by line 20 to the top of the tower. The reflux control valve position indicates the amount of reflux and the target value will be close to the fully open position of the control valve. For illustration of the invention, the limitation represented by a fully opened valve will be used as a hard constraint. The bottom product rate as measured by FR-31 is also a key variable and is transmitted to the constraint controller 29 for comparison with its target value.

In the process of FIG. 1, the constraint controller 29 receives information on the heat input to furnace 17, the pressure differential across tower 10, the reflux rate to the tower and the bottom product rate. Each of the variables are scanned in sequence (or simultaneously), the instant values are compared with their target values, the deviations from target values are divided by the constraint sensitivity (as defined by the referenced application) corresponding to each variable, the limiting variable is selected, and a signal is sent to FRC 21 to adjust feed flow rate in order to bring the limiting variable to its target value. This may result in a raising or lowering of the feed rate to the column.

In normal operation, when the position of the valve TRCV 27 is not limiting, the signal which is transmitted to constraint controller 29 will be simply the actual valve position as measured. If, for example, the overhead composition becomes substantially heavier, there will be a marked temperature increase measured by TRC 27 and TRCV 27 will open. The target value of TRCV 27 will be the nearly full open position if it is assumed that maximum throughput is the objective. There would be ordinarily no reason to establish a lower value since that could unnecessarily limit the process. But the valve when full open, is no longer in control. The deviation from target value may appear to be quite small whereas the amount of cooling required actually is much more. The constraint control system, sensing this apparently small deviation, will take a small corrective action and the extent and duration of the upset will be substantially longer than would be desired. Accordingly, the invention is applied to augment the valve position signal proportionally to the difference between the controller set point and the measured value of temperature. This augmented valve position reflects the true condition, i.e., where the valve would be positioned if it had not reached its constraint. The constraint control system is enabled to correct the feed rate with the full knowledge of the extent of the upset which has been experienced by the unit.

Referring to equations (1) and (2), it will be noted that the constraint augmenting does not occur unless the valve (TRCV) is fully open. If the valve is not fully open, the actual operating measurement ($T_{M_E}$) is directed to the constraint controller 29 for determination of the error by comparison with the target value. If the valve is fully open, then to the actual measurement ($TM_E$) is added the difference between the desired and actual values of the related process measurement. This augmented value is directed to constraint controller 29 for determination of the error in the normal manner.

Figure 2:
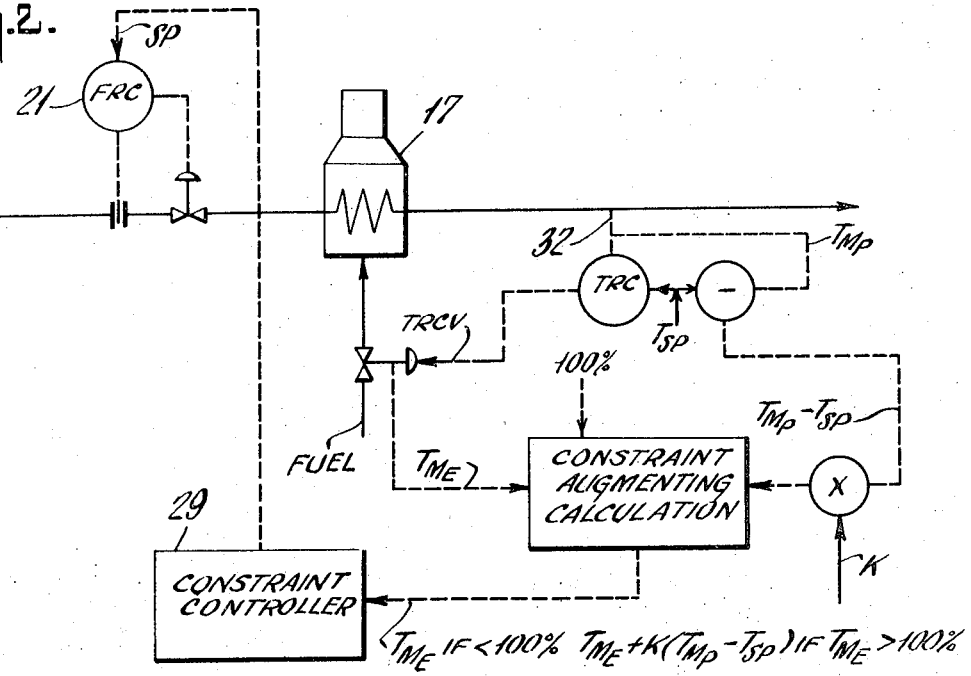
FIG. 2 illustrates the application of the present invention to a furnace constraint control system.

FIG. 2 illustrates the application of the invention to a constraint control system operating in a similar fashion to that of FIG. 1 but in which the coil outlet temperature of the furnace 17 measured by TRC 23 is used to directly control the fuel being fired. If for some reason the feed entered the furnace 17 at an unusually low temperature or with a higher specific heat, the coil outlet temperature would drop, causing the normal control system TRC 32 to open TRCV 32 fully to provide maximum firing. The coil outlet temperature might continue to be low if the feed change was severe. The constraint controller would then receive a signal representative of the valve position, but without the present invention, the controller 29 would only recognize the error to the extent of the difference between the target value and the actual value. The correction applied to FRC 21 would be smaller than it should be since constraint controller 29 would be responding to an apparently small error (say target value 98 percent open and actually 100 percent open). By applying the present invention, the true extent of the error is measured by augmenting the valve position signal so that the constraint controller would become apprised that the temperature measured by TRC 32 was still too low relative to the desired controller set point. The constraint controller 29 would receive the augmented valve position signal and, realizing the coil outlet temperature was out of control, would take corrective action by substantially reducing the feed rate through FRC 21.

Figure 3:
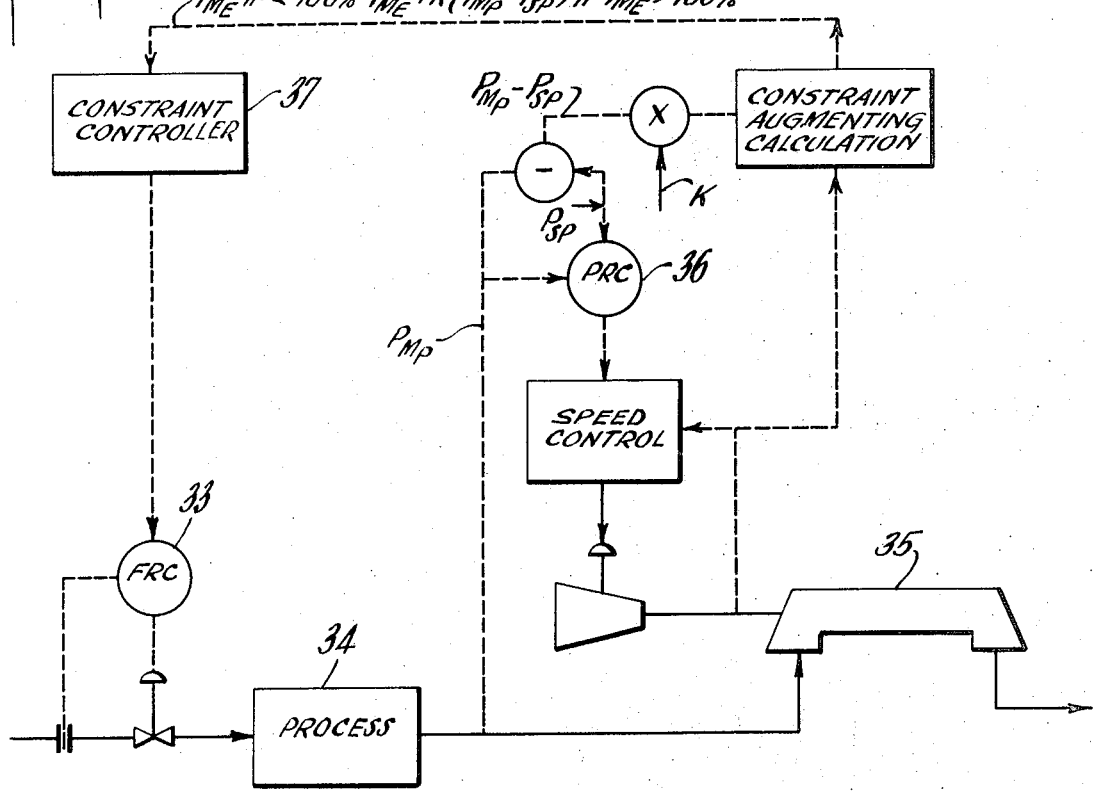
FIG. 3 illustrates the application of the invention to a compressor constraint control system.

In FIG. 3, the invention is applied to a compressor control system. FRC 33 controls feed to a process 34 and it is desired to operate with the maximum possible feed rate. Gas leaving the process 34 is compressed by compressor 35, the speed of which is adjusted to maintain pressure by PRC 36. The speed control of the compressor is subject to a hard constraint, the maximum allowable speed. If an upset in the process should raise gas flow so that it exceeds the ability of the compressor to handle it, the compressor will operate at its maximum speed while the pressure exceeds the set point of PRC 36. The normal speed signal would not detect the extent of the process deviation and the constraint controller 32 would make a smaller correction to FRC 33 than it should, thus preventing the rapid action needed. According to the invention, the normal speed signal would be augmented by the difference between the actual pressure and the pressure which is desired, i.e., the set point of PRC 36. With this augmented error, the constraint control system 37 receives a true measure of the extent of the process excursion and can take action accordingly by making an appropriate adjustment to the feed rate through FRC 33.

The invention might be applied to essentially any industrial process and is not limited to its application to petroleum refining or chemical processes. It may find its use wherever hard constraints are found and incorporated within a constraint control system.

The foregoing description of the preferred embodiment is for information and illustration of the invention only and is not intended to limit the scope thereof as applied by the claims which follow.

What is claimed is:

1. In a constraint control system for controlling the performance of processes in which instant values of preselected operating variables are measured, the deviation of said instant values from their predetected target values is determined, the instant limiting variable is identified as the one requiring the most restrictive change to a predetermined manipulated variable and an adjustment is made to said predetermined manipulated variable to bring the limiting variable to its target value, wherein the improvement comprises:

when said operating variable is an equipment position which is automatically controlled relative to the deviation process of a measurement from the set point of the associated controller and said operating variable is subject to a hard constraint which cannot be exceeded and which prevents its indicating the correct deviation of said variable from its target value, augmenting the instant deviation of said operating variable in order to make said instant deviation reflect the deviation of said process measurement from the set point of the associated controller.

2. The constraint control system of claim 1 wherein said augmentation of the instant deviation of said operating variable from its target value consists of adding to said instant deviation a value proportional to the difference between said process measurement and the set point of the associated controller.

* * * * *